United States Patent [19]

Slaughter

[11] Patent Number: 4,747,664
[45] Date of Patent: May 31, 1988

[54] ROTARY REFLECTIVE MARKER

[76] Inventor: Harold W. Slaughter, P.O. Box 461, West Fargo, N. Dak. 58078

[21] Appl. No.: 810,659

[22] Filed: Dec. 17, 1985

Related U.S. Application Data

[63] Continuation-in-part of Ser. No. 728,238, Apr. 29, 1985, abandoned, which is a continuation-in-part of Ser. No. 553,964, Nov. 21, 1983, abandoned.

[51] Int. Cl.$^4$ .............................................. G02B 5/12
[52] U.S. Cl. ...................................... 350/99; 350/101
[58] Field of Search ................................. 350/97–101; 362/310, 311, 281, 341

[56] References Cited

U.S. PATENT DOCUMENTS 4,104,614  8/1978  Litman .
4,108,535  8/1978  Slaughter .
4,204,746  5/1980  Fisher .
4,208,087  6/1980  Cooper et al. .
4,229,781 10/1980  Hitora .
4,291,365  9/1981  Tandar et al. .
4,307,528 12/1981  DeWees et al. .
4,317,444  3/1982  Maruko .
4,362,931 12/1982  Maruko et al. .
4,386,391  5/1983  Gulliksen et al. .

FOREIGN PATENT DOCUMENTS 0014986  2/1980  European Pat. Off. .............. 350/97

OTHER PUBLICATIONS

Safety Systems Product Bulletin, Oct. 1978, "Scotchlite" Brand Reflective Sheeting S10-10, 3M Introduction to Reflective Materials.

Primary Examiner—John K. Corbin
Assistant Examiner—Loha Ben
Attorney, Agent, or Firm—Merchant, Gould, Smith, Edell, Welter & Schmidt

[57] ABSTRACT

A rotary reflective marker (10) is provided which may be mounted on either a stationary or a mobile object. The marker has a rotatable member (12) and includes a light reflective portion (13) arranged in a generally spiral or intermittant pattern so that as the member (12) revolves the spiral pattern of the light reflective portion (13) appears to move causing the marker to be more visually perceptible to an observer at a distance. A weight braking system is also provided to control the rotational speeds of the member (12). The marker may be powered by ambient wind forces or by conventional mechanical mechnisms.

10 Claims, 2 Drawing Sheets

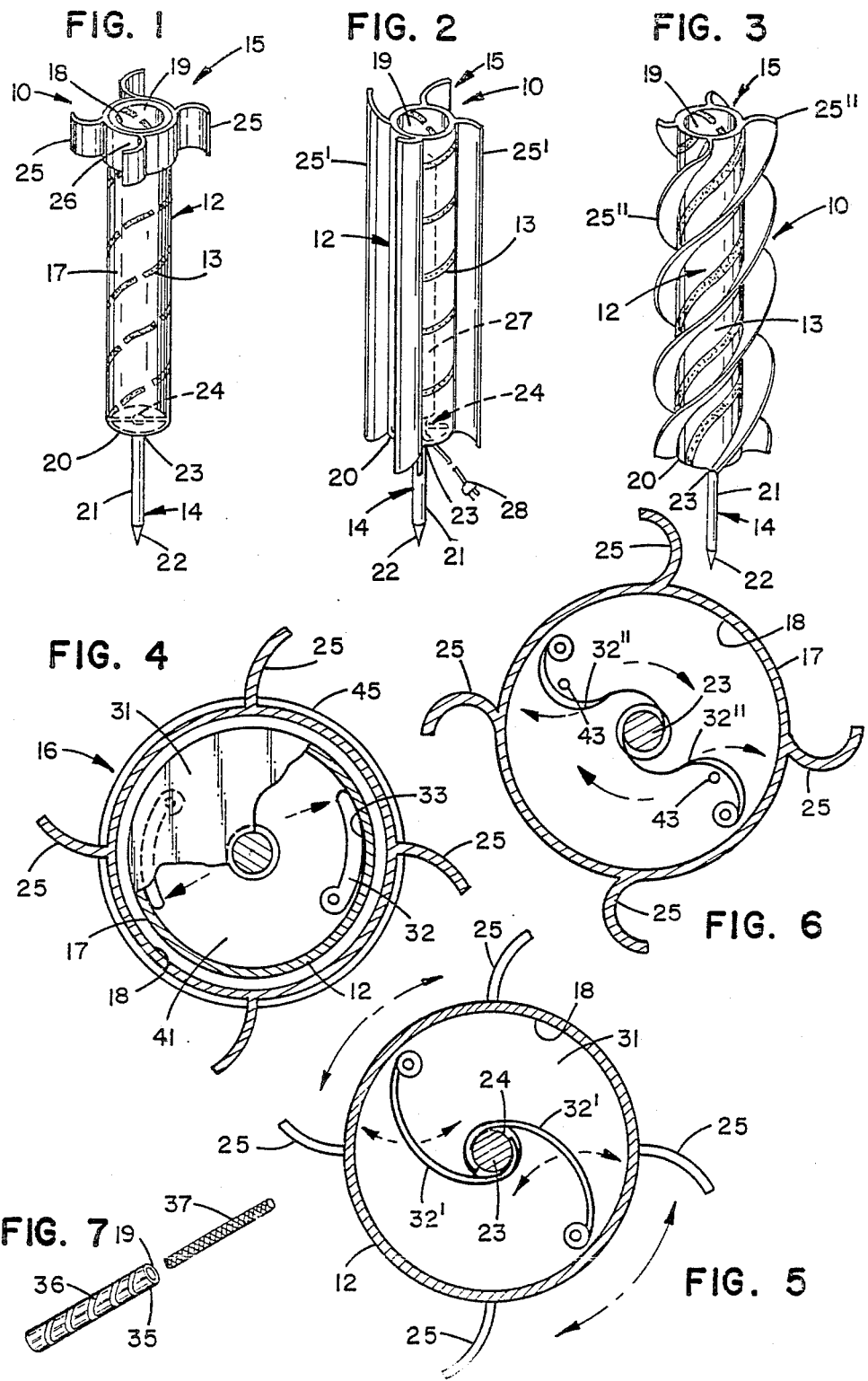

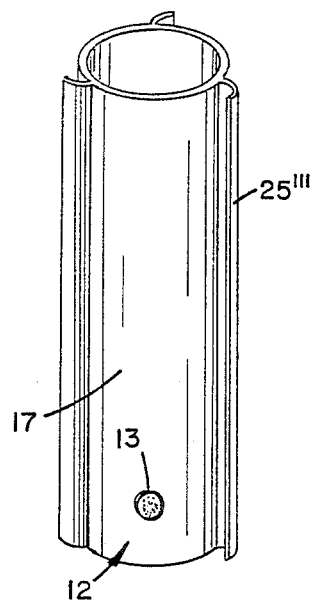
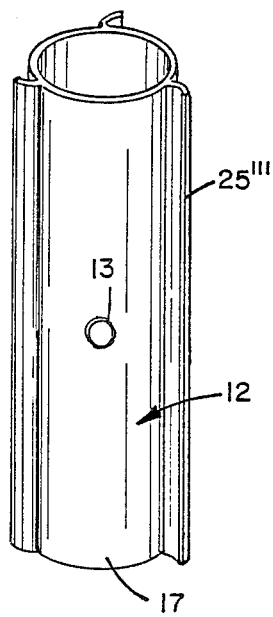
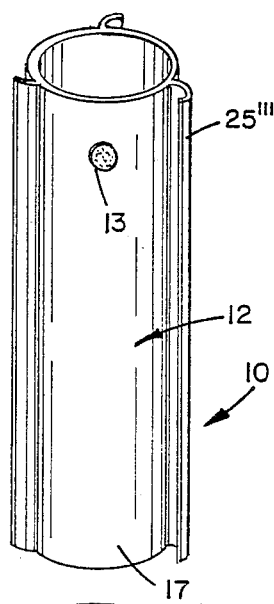
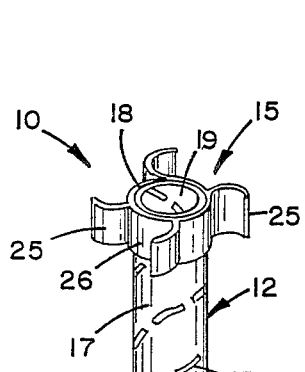
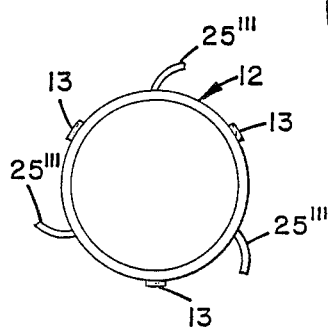
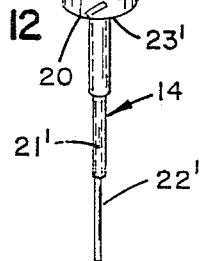
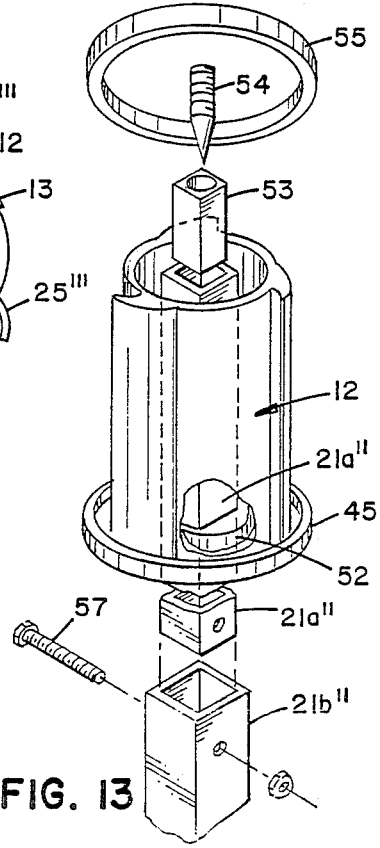

ROTARY REFLECTIVE MARKER

This application is a continuation-in-part of applicant's copending application Ser. No. 728,238, filed Apr. 29, 1985 which is a continuation-in-part of applicant's application Ser. No. 553,964, filed Nov. 21, 1983, now abandoned.

TECHNICAL FIELD

The present invention relates to reflective devices used to indicate the existence of an object which might not otherwise be readily apparent, and in particular to a marker having a reflective portion which changes in appearance with the rotation of the marker.

BACKGROUND

Numerous devices used to indicate the location and/or the existence of otherwise visually imperceptible or obscured objects are known in the prior art. Such prior art devices are oftentimes specifically intended for a particular use rather than universal application. Thus numerous markers or devices of various construction and capabilities exist on the marketplace.

In recent years the invention of retro-reflective material which is readily available commercially, has resulted in new designs and construction to achieve improved performance of markers and thus provide increased safety as intended but not always achieved with the prior art devices. As a result of more reliable reflective mechanisms being available, the construction of markers and other safety devices may be more simple and more universal and adaptable for increased use in a wider variety of applications.

The present invention is of this nature, i.e. relatively simple in construction, with broad application to various situations, and it provides reliable reflectivity to insure greater safety to both the observer and user of the invention.

SUMMARY OF THE INVENTION

The present invention is a rotary reflective marker which may be mounted to either a stationary or mobile object. A rotatable portion of the invention includes a light reflective or a light emitting portion arranged in a generally spiral pattern. As the rotatable portion revolves the spiral portion or pattern appears to move in a manner which enhances or increases the observer's visual ability to perceive the existence of the marker and hence the existence and location of the object to which the marker is mounted.

The invention may be rotated either by air flows in the ambient atmosphere or by conventional mechanical power sources, including electricity. To regulate the rotation, a weight braking system is provided which, as a result of centrifugal forces, slows the rotation of the marker by frictional force.

The present invention is suitable for securement to an automobile, bicycle, etc., as well as insertion into the ground to mark the approach of a driveway or to indicate the existence of a road barricade or like situation. With its unique construction and reflective capability, the present invention may also be used to provide eye-catching advertisement.

Other uses for and a further understanding of the present invention will be appreciated after a reading of the detailed description which follows hereafter.

BRIEF DESCRIPTION OF THE DRAWINGS

FIG. 1 is a perspective view of one embodiment of the present invention.

FIG. 2 is a perspective view of another embodiment of the present invention.

FIG. 3 is a perspective view of yet another embodiment of the present invention.

FIG. 4 is a cross-sectional view of the present invention illustrating one embodiment of the weight braking system.

FIG. 5 is a cross-sectional view of the present invention illustrating another embodiment of the weight braking system.

FIG. 6 is a cross-sectional view of the present invention illustrating yet another embodiment of the weight braking system.

FIG. 7 is an exploded, perspective view of a fourth embodiment of the present invention.

FIG. 8 is a perspective view of an embodiment of the present invention showing an alternative arrangement of reflective portions.

FIG. 9 is a perspective view of the embodiment of the present invention in FIG. 8 rotated approximately one-third of a rotation or 120 degrees.

FIG. 10 is a perspective view of the embodiment of the present invention in FIG. 8 rotated approximately two-thirds of a rotation or 240 degrees.

FIG. 11 is a plan view of the embodiment of the present invention in FIGS. 8–10 showing the alternative arrangement of reflective portions.

FIG. 12 is a perspective view of the embodiment of the present invention in FIG. 1 showing an alternate shaft.

FIG. 13 is an exploded, perspective view of an alternate embodiment of the present invention showing yet another shaft and bearing arrangement.

DETAILED DESCRIPTION OF THE PRESENT INVENTION

Referring to the drawings, wherein like numerals represent like elements throughout the several views, there is illustrated the rotary reflective marker of the present invention, generally designated as 10. While several embodiments of the present invention are illustrated, each embodiment has in common the following elements: a rotatable member or body 12, a portion or portions 13 arranged in a spiral configuration which will reflect and/or emit light, a mechanism 14 for securing the rotatable member to an object for rotation relative thereto, a mechanism 15 for driving the member 12 in a rotational movement, and a braking system 16 for controlling the rotational movement of the member 12. The various embodiments will be described in detail but it will be appreciated by those skilled in the art that the several disclosed modifications for the common elements may be combined in a number of ways, not illustrated, to yield additional embodiments.

Referring now to FIG. 1, the rotatable member 12 of the marker shown is cylindrical in shape and has an outer wall 17, an inner wall 18, and a substantially hollow interior 19 defined by the inner wall. While a cylindrical shape is preferred for the present invention other shapes may be suitable when the marker is constructed in accordance with the basic teachings of the present invention.

A mechanism 14 for mounting or securing the invention to either a fixed or mobile object is provided at one end 20 of the cylindrical member 12. If the marker is to be inserted into the ground, for example to indicate a driveway approach, a shaft 21 of sufficient length may be used. To facilitate positioning the rotatable member 12 at a specific desired height, a telescopic shaft 21' such as that shown in FIG. 12 can be provided. It will be appreciated that inclusion of a telescopic shaft 21' produces a rotary reflective marker having an adjustable rotatable member 12 which can be positioned at an optimal viewing height with respect to the surrounding environment. As shown in FIG. 1 the shaft 21 has a free end 22 which is pointed to ease the insertion of the shaft into the ground. The opposite end 23 of the shaft 21 is fixedly secured to a bushing and bearing arrangement 24 which secures the shaft 21 in a stationary position relative to the object to which it is attached. This arrangement 24 allows the rotatable member 12 to rotate freely about the shaft 21. To those skilled in the art, further explanation of the bushing and bearing arrangement 24 is not believed necessary for an appreciation of the invention. Of course, other methods for fixing the shaft 21 relative to the rotatable member 12 and an object (not shown) may be used so long as the method does not prevent rotation of the member 12.

In FIG. 1 the light reflective portion 13 of the present invention is illustrated as being applied as a spiral around and along the length of the outer wall 17 of the rotatable member 12. This spiral configuration, however, is intermittently interrupted so as to provide relatively short breaks at repetitive intervals along the length of the spiral. Of course, the light reflective portion may be of any length and have any number of segments. Alternatively, the light reflective portion may be applied in a continuous spiral as shown in FIGS. 2 and 3.

In accordance with the present invention, only a limited number of reflective portions 13 are necessary to form the intermittent spiral. As few as two or three reflective portions 13 arranged along the outer wall 17 of the rotatable member 12 can produce a pronounced perception of movement as the marker rotates. When compared to a continuous spiral pattern, an intermittent spiral formed by a limited number of the reflective portions 13 provides a more pronounced perception of movement of the marker as it rotates. For example, the reflective portions 13 can be arranged along the marker 10 as illustrated in FIGS. 8-11. FIG. 8 shows a first reflective portion 13 near the bottom of the outer surface 17 of the marker 12. As seen in FIG. 9 a second reflective portion is located near the center of the outer surface 17 of the rotatable member 12 approximately one third of a rotation or 120 degrees around the rotatable member 12 from the reflective portion shown in FIG. 8. A third reflective portion is located near the top of the rotatable member 12 approximately two thirds of a rotation or 240 degrees around the rotatable member from the reflective portion shown in FIG. 8. In operation, the reflective pattern shown in FIGS. 8-11 provides an enhanced sense of movement all the way from the top of the rotatable member 12 to the bottom of the rotatable member 12. The visual effect created by the rising and off-set reflective pattern shown in FIGS. 8-11 is much like that created by a ball bouncing in front of a strobe light. In FIGS. 8-10, the vanes are represented at 25.

The light reflective portion 13 may be constructed from a commercially available product of the 3M Company (Minnesota Mining and Manufacturing). The preferred product is the SCOTCHLITE Brand of reflective sheeting which is generally characterized as an exposed lens reflective sheeting in which glass beads are bonded to a durable plastic resin. This material is believed preferable to others in that it is durable and provides a uniform and wide angle of reflectivity, thus providing greater assurance that an observer will readily perceive the marker's existence. Other materials may be suitable for the purposes of the invention if the reflective properties for the selected material enable the observer to discover the presence of the invention from a range of angles measured relative to the invention. The preferred material is generally described as being retro-reflective.

A mechanism for rotating the member 12, in order to create the appearance of movement by the reflective portion 13, may be any conventional mechanical power mechanisms. The preferred mechanism is a plurality of vanes 25 fixedly secured, as shown in FIG. 1, to an upper or free end of the rotatable member 12. This type of mechanism allows the invention to be "powered" by available air flows in the ambient atmosphere and thus eliminates the need for additional sources of either mechanical or electrical power. The number and size of the vanes may be determined by the user as dictated by the prevailing weather conditions where the marker is to be used. It will be appreciated that the vanes 25 may be slightly curved, as seen in the FIGS., to facilitate rotation of member 12 in one direction. In FIG. 1, four vanes 25 are formed integral with a ring 26 having an inside diameter substantially equal to the outside diameter of the outer wall 17 of the rotatable member. The ring 26 may be adhesively fixed to the outer wall 17, or held in place by frictional forces arising from the snug fit between the ring 26 and outer wall 17. Whatever method of securement is selected, the relationship must be fixed so that movement of the vanes 25 by air flow simultaneously causes rotational movement of the member 12.

The embodiment of the present invention shown in FIG. 2 differs from that of FIG. 1 in that the vanes 25' are constructed to extend downwardly along the full length of the rotatable member's outer wall 17. The vanes 25' are spaced apart from each other equally around the outer wall. Each vane 25' is fixed relative to the rotatable member 12 and together cause simultaneous movement of the member 12 when an air flow causes movement of the vanes 25'.

The embodiment in FIG. 2 also includes constructing the spiral portion 13 of the rotatable member 12 from a transparent material, e.g. a clear plastic, constructing the remainder of the rotatable member 12 of a nontransparent material, and providing a source of light 27 within the rotatable member interior 19. The source of light 27 may be a conventional light bulb which is energized by an electrical current, either A.C. or D.C. It will be appreciated that the light 27 may be attached at any position along the shaft 21 so long as the light 27 does not interfere with the rotation of the member 12. A cord 28 for transferring the electrical current to the bulb 27 is provided in a conventional manner. Thus, in this particular embodiment not only does the spiral portion or reflective lens 13 provide visual perception of the marker 10, but the perception may be further increased by the illumination of the rotatable member 12 by the light source 27. Further, it will be appreciated that the number of and arrangement of reflective lens 13 in FIG. 2 can be similar to that shown in FIGS. 8-11, thereby producing an enhanced sense of movement with a limited number of reflective portions offset around the outer surface 17 of the rotatable member 12.

The embodiment illustrated in FIG. 3 of the drawings differs from that of FIGS. 1 and 2 in that the mechanism for rotating the member 12 is a series of vanes 25" formed integral with the outer wall 17, each in a spiral pattern formed substantially parallel with the reflective portions 13 extending between the vanes 25". In this embodiment, light reflective material may also be applied to the vanes. This application may supplement the portions 13 shown in the drawing or may serve as the primary source for the light reflective feature of this particular embodiment of the invention.

A weight braking system is provided in the present invention in order to control the rotational movement of the member 12 and thereby maintain a proper viewing perspective of the reflective portion 13 for the observer. A preferred braking system is a pair of pivotal spring tensioned cams 32 positioned within the interior 19 of the rotatable member 12. In FIG. 4 one embodiment of the braking system is illustrated. An end cap 45 and plate 31 are rotatably attached to the second end 23 of the shaft 21. A pair of arcuate shaped cams 32 are pivotally mounted to the plate opposite each other so as to balance one another. The cams 32 are mounted to move freely in response to the centrifugal forces resulting from the rotational movement of the member 12. As the centrifugal forces increase each cam moves outwardly towards the inner wall 18. When sufficient rotational speed has been reached by the member 12, the cams 32 will simultaneously contact the edges 33 of a fixed drum 41 attached to the shaft 23. The edges 33 of the fixed drum 41 project between the outer edge of the plate 31 and the inner wall 18. The resulting frictional forces created between the cams and the contact surface, 33, will counteract the centrifugal forces and cause the member 12 to slow down. When sufficiently slowed the diminished centrifugal forces allow the cams to return to their normal positions, i.e. away from contact with the edges 33 of the fixed drum 41. Thus the cams 32 of the braking system serve as weights to counterbalance the centrifugal forces resulting from the rotation of the member, and thus serve to maintain the rotational speeds of the member 12 at a level which best allows the observer to perceive the reflected spiral pattern of the reflective material.

FIG. 5 illustrates a like braking system; however, the cams 32' are constructed so as to pivot and move inwardly to contact the shaft. Specifically, as the centripetal forces increase each cam moves inwardly toward the shaft 23. When sufficient rotational speed has been reached by the member 12, the cams 32' will simultaneously contact the outer surface 24 of the shaft 23. The resulting frictional forces created between the cams 32' and the outer surface of the shaft will counteract the centripetal forces and cause the member 12 to slow down. When sufficiently slowed the diminished centripetal forces allow the cams 32' to return to their normal position i.e. away from contact with the shaft. It will be appreciated that this embodiment of the braking system eliminates the need for the fixed drum 41 required for operation of the braking system shown in FIG. 4.

In FIG. 6 yet another alternate embodiment of the braking system is shown. As in FIG. 5, the cams 32" are constructed so as to pivot and move inwardly to contact the shaft 23. The braking system shown in FIG. 6 is designed to operate when the member 12 rotates in a clockwise direction. As in the case of the embodiment in FIG. 5, as centripetal forces increase, the cams 32" move inwardly toward the shaft. When sufficient rotational speed has been reached by the member 12 the cams 32" will simultaneously contact the outer surface of the shaft 23 to slow the movement of the member 12. When sufficiently slowed the diminished centripetal forces allow the cams 32" to return to their normal positions i.e. away from contact with the shaft. Pins 43 are provided on rotatable plate 31 to limit the outward movement of cams 32" away from the shaft when the member 12 rotates counter clockwise. It will be appreciated that the shape of the cams 32" and curved vanes 25 in FIG. 6 can be designed to allow operation of the braking system when the member 12 rotates in a counter clockwise direction.

A further embodiment of the present invention is partially shown in FIG. 7 to illustrate another possible construction for the rotatable member 12 and reflective portions 13 of the present invention. In this embodiment an outer cylindrical body 35 is provided and constructed from a substantially non-transparent material but the outer body includes a transparent, or in the alternative open, portion 36 extending in a spiral pattern along the length of the body 35. Into the interior 19 of the outer cylindrical body 35, an inner body 37 is inserted. The inner body 37 may be a transparent reflective lens, and it may be secured either to the outer body 35 so as to rotate simultaneously therewith or it may be fixedly secured to the mounting mechanism so as to remain stationary as the outer body 35 rotates.

In FIG. 13 still another alternate embodiment of the present invention is shown to illustrate another possible construction of the shaft. In this embodiment a two-piece shaft 21a", 21b" is provided. Particularly, the two-piece shaft includes a first or outer portion 21b" external to rotatable member 12 and a second or inner portion 21a" extending completely through to the top of the rotatable member 12. The inner portion 21a" has a smaller diameter than the outer portion 21b" and is secured at one end to the outer portion 21b" by retaining means, such as bolt 57. The opposite end of the inner shaft portion 21a" is secured to an upper end cap 55 including a jewel bearing 54 by a race 53 which accommodates the jewel bearing 54 therein. A retainer 52 at the lower end of the rotatable member 12 keeps the rotatable member 12 from being removed from the shaft 21a". It will be appreciated that a combination retainer bushing and/or bearing could replace the retainer 52 at the lower end of the rotatable member 12.

Still another embodiment of the invention, which is not illustrated in the drawings, may have light emission capabilities rather than or in addition to the retro-reflective or light reflective capabilities described above. The rotatable member 12 may be provided with a photoluminescent material, e.g. a fluorescent coating. In such an embodiment fluorescent radiation would result from the light of a source such as a car's headlights, a flashlight, etc. Whether light is reflected or emitted is a matter of choice as the objectives and advantages of the present invention would be achieved in either case.

From the foregoing description the operation of the present invention should be readily apparent. Whether viewed in the daytime or in the darkness of the night the present invention's unique combination of a light reflecting material, applied in a continuous spiral or intermittent spiral pattern, with a rotatable member provides a highly visible marker. The existence of the marker, along with the object which it is marking, becomes visually perceptible at a distance with the apparent or perceived changes in the appearance of the reflective portions as a result of the rotation of the marker's body. The marker serves as a reliable safety device which provides ample warning to approaching observers.

Of course other modifications from those shown in the drawings will be possible by those skilled in the art and the invention is not believed to be strictly limited by the description and drawings but rather limited only by the scope of the claims which follow.

What is claimed is:

1. A reflective marker suitable for attracting an observer's attention; said marker comprising:
   (a) a rotatable member having an outer wall and an inner cylindrical wall defining an internal longitudinal bore having an axis;
   (b) a bushing and bearing arrangement including means mounting said rotatable member for rotation about said longitudinal bore axis;
   (c) a non-rotatable internal shaft member mounted to extend along and inside said rotatable member longitudinal bore;
   (d) a brake mechanism mounted on said rotatable member;
      (i) said brake mechanism including a plurality of cams, each cam being pivotally mounted within said rotatable member longitudinal bore to pivot and extend inwardly toward said non-rotatable internal shaft member as said rotatable member rotates;
      (ii) each of said cams including a friction portion thereon constructed and arranged to engage said non-rotatable internal shaft and selectively brake said rotatable member;
   (e) means mounted in association with said rotatable member to selectively rotate same; and
   (f) reflective means applied to said rotatable member outer wall, for reflecting light rays from a light source to an observer.

2. The marker according to claim 1 wherein said means for rotating said rotatable member comprises wind vane means mounted on said rotatable member outer wall.

3. The marker according to claim 2 wherein said vane means comprises a spiral vane arrangement.

4. The marker according to claim 3 wherein said spiral vane arrangement comprises four vane members oriented in two double helix patterns.

5. The marker according to claim 1 wherein:
   (a) said non-rotatable internal shaft member comprises an elongate rod member; and
   (b) said brake mechanism includes two of said cams, each of which is s-shaped.

6. The marker according to claim 1 wherein:
   (a) said non-rotatable internal shaft member comprises an internal cylinder member; and,
   (b) said brake mechanism includes two of said cams.

7. The marker according to claim 1 wherein:
   (a) said reflective means includes a plurality of spaced reflectors mounted on said rotatable member outer wall;
      (i) a first of said reflectors being mounted substantially adjacent, but spaced from, a first end of said rotatable member;
      (ii) a second of said reflectors being mounted substantially adjacent, but spaced from, a second end of said rotatable member; and
      (iii) a third of said reflectors being mounted in a central portion of said rotatable member outer wall; and,
   (b) said rotatable member outer wall is cylindrical;
      (i) said first, second and third spaced reflectors being positioned spaced rotationally apart from one another on said rotatable member outer wall.

8. The marker according to claim 1 wherein:
   (a) said rotatable member is a substantially cylindrical rotor;
      (i) said cylindrical rotor having substantially transparent wall portions and substantially non-light-transmitting wall portions;
   (b) said reflective means comprises reflector members mounted over said rotor transparent wall portions, said reflector members constructed and arranged to permit transmission of a substantial amount of light outwardly therethrough from inside of said rotor and to selectively reflect a substantial amount of light directed thereagainst from outside of said marker; and
   (c) said marker includes a light-emitting source mounted non-rotatably therein, and positioned inside of said rotor.

9. A reflective marker suitable for attracting an observer's attention; said marker comprising:
   (a) a rotatable member having an outer wall and an inner cylindrical wall defining an internal longitudinal bore having an axis;
      (i) said rotatable member being a substantially cylindrical rotor having substantially transparent wall portions and substantially non-light-transmitting wall portions;
   (b) a bushing and bearing arrangement including means mounting said rotatable member for rotation about said longitudinal bore axis;
   (c) a non-rotatable internal shaft member mounted to extend along and inside said rotatable member longitudinal bore;
   (d) vane means mounted on said rotatable member outer wall to rotate same; and
   (e) reflective means applied to said rotatable member outer wall, for reflecting light rays from a light source to an observer;
      (i) said reflective means comprising reflector members mounted over said rotor transparent wall portions, said reflector members being constructed and arranged to permit transmission of a substantial amount of light outwardly therethrough from inside of said rotor and to selectively reflect a substantial amount of light directed thereagainst from outside of said marker; and
   (f) a light-emitting source mounted non-rotatably therein, and positioned inside of said rotor.

10. A reflective marker suitable for attracting an observer's attention; said marker comprising:
   (a) a rotatable member having an outer wall and an inner cylindrical wall defining an internal longitudinal bore having an axis;
      (i) said rotatable member being a substantially cylindrical rotor having substantially transparent wall portions and substantially non-light-transmitting wall portions;
   (b) a bushing and bearing arrangement including means mounting said rotatable member for rotation about said longitudinal bore axis;

(c) a non-rotatable internal shaft member mounted to extend along and inside said rotatable member longitudinal bore;
(d) means associated with said rotatable member outer wall to rotate same; and,
(e) reflective means applied to said rotatable member outer wall, for reflecting light rays from a light source to an observer;
  (i) said reflective means comprising reflector members mounted over said rotor transparent wall portions, said reflector members being constructed and arranged to permit transmission of a substantial amount of light outwardly therethrough from inside of said rotor and to selectively reflect a substantial amount of light directed thereagainst from outside of said marker; and,
(f) a light-emitting source mounted non-rotatably therein, and positioned inside of said rotor.

* * * * *